United States Patent
Singh

(10) Patent No.: US 11,637,372 B2
(45) Date of Patent: Apr. 25, 2023

(54) MOBILE COMPUTING DEVICE HAVING A MODAL ANTENNA

(71) Applicant: AVX Antenna, Inc., San Diego, CA (US)

(72) Inventor: Abhishek Singh, San Diego, CA (US)

(73) Assignee: KYOCERA AVX Components (San Diego), Inc., San Diego, CA (US)

(*) Notice: Subject to any disclaimer, the term of this patent is extended or adjusted under 35 U.S.C. 154(b) by 170 days.

(21) Appl. No.: 16/745,547

(22) Filed: Jan. 17, 2020

(65) Prior Publication Data

US 2020/0251823 A1  Aug. 6, 2020

Related U.S. Application Data

(60) Provisional application No. 62/799,071, filed on Jan. 31, 2019.

(51) Int. Cl.
  *H01Q 5/314* (2015.01)
  *H04L 27/02* (2006.01)
  (Continued)

(52) U.S. Cl.
  CPC ............. *H01Q 5/314* (2015.01); *H01Q 5/378* (2015.01); *H01Q 9/0442* (2013.01); *H04L 27/02* (2013.01)

(58) Field of Classification Search
  CPC .... H01Q 1/2258; H01Q 1/2266; H01Q 5/314; H01Q 5/378
  See application file for complete search history.

(56) References Cited

U.S. PATENT DOCUMENTS

| 6,765,536 B2 | 7/2004 | Phillips et al. |
| 6,987,493 B2 | 1/2006 | Chen |

(Continued)

FOREIGN PATENT DOCUMENTS

| JP | 2003-209425 | 7/2003 |
| JP | 2008-28907 | 2/2008 |

(Continued)

OTHER PUBLICATIONS

International Search Report and Written Opinion for PCT/US2020/014029, dated May 20, 2020, 11 pages.

(Continued)

*Primary Examiner* — Andrea Lindgren Baltzell
(74) *Attorney, Agent, or Firm* — Dority & Manning, P.A.

(57) ABSTRACT

A mobile computing device including a modal antenna is disclosed. The mobile computing device may include a radio frequency circuit and a modal antenna mechanically coupled to a portion of the mobile computing at a location that is remote from the radio frequency circuit. The modal antenna may include a driven element and a parasitic element positioned proximate to the driven element. The modal antenna may be operable in a plurality of different modes. Each mode may be associated with a different radiation pattern. The mobile computing device may include a transmission line coupling the radio frequency circuit to the modal antenna. The radio frequency circuit may be configured to transmit an RF signal over the transmission line to the modal antenna and configured to communicate a control signal to adjust the mode of the modal antenna over the transmission line.

10 Claims, 14 Drawing Sheets

(51) Int. Cl.
*H01Q 9/04* (2006.01)
*H01Q 5/378* (2015.01)

(56) References Cited

U.S. PATENT DOCUMENTS

| | | | |
|---|---|---|---|
| 7,068,234 | B2 | 6/2006 | Sievenpiper |
| 7,215,289 | B2 | 5/2007 | Harano |
| 7,830,320 | B2 | 11/2010 | Shamblin |
| 7,911,402 | B2 | 3/2011 | Rowson et al. |
| 8,362,962 | B2 | 1/2013 | Rowson et al. |
| 8,446,318 | B2 | 5/2013 | Ali et al. |
| 8,648,755 | B2 | 2/2014 | Rowson et al. |
| 8,717,241 | B2 | 5/2014 | Shamblin et al. |
| 9,065,496 | B2 | 6/2015 | Rowson et al. |
| 9,231,669 | B2 | 1/2016 | Desclos et al. |
| 9,240,634 | B2 | 1/2016 | Rowson et al. |
| 9,325,543 | B2 | 4/2016 | Desclos et al. |
| 9,425,497 | B2 | 8/2016 | Pajona et al. |
| 9,439,151 | B2 | 9/2016 | Zhu et al. |
| 9,479,242 | B2 | 10/2016 | Desclos et al. |
| 9,590,703 | B2 | 3/2017 | Desclos et al. |
| 9,755,305 | B2 | 9/2017 | Desclos et al. |
| 9,755,580 | B2 | 9/2017 | Desclos et al. |
| 9,768,991 | B2 | 9/2017 | Desclos et al. |
| 10,263,817 | B1 | 4/2019 | Roe et al. |
| 2005/0099269 | A1* | 5/2005 | Diorio ................ G06K 19/0723 340/10.2 |
| 2011/0007846 | A1 | 1/2011 | Marien |
| 2011/0068994 | A1 | 3/2011 | Matsuoka |
| 2011/0234462 | A1* | 9/2011 | Aoki ...................... H01Q 1/243 343/702 |
| 2013/0120200 | A1 | 5/2013 | Desclos et al. |
| 2014/0133525 | A1* | 5/2014 | Desclos .................. H04B 1/40 375/238 |
| 2015/0244059 | A1* | 8/2015 | Onaka .................... H01Q 21/28 343/702 |
| 2015/0311969 | A1 | 10/2015 | Desclos |
| 2016/0036127 | A1 | 2/2016 | Desclos et al. |
| 2016/0048163 | A1 | 2/2016 | Degner et al. |
| 2017/0012681 | A1 | 1/2017 | Buliga et al. |
| 2017/0288295 | A1 | 10/2017 | Sultenfuss et al. |
| 2017/0338557 | A1 | 11/2017 | Desclos et al. |
| 2018/0097287 | A1* | 4/2018 | Matsuoka ................ H01Q 5/35 |
| 2019/0214721 | A1 | 7/2019 | Hu et al. |

FOREIGN PATENT DOCUMENTS

| | | |
|---|---|---|
| JP | 2010-213116 | 9/2010 |
| JP | 2018-56693 | 4/2018 |
| KR | 10-2018-0131979 | 12/2018 |
| WO | WO 2014074129 | 5/2014 |

OTHER PUBLICATIONS

Supplementary European Search Report for Application No. 20747997, dated Jul. 5, 2022, 11 pages.

* cited by examiner

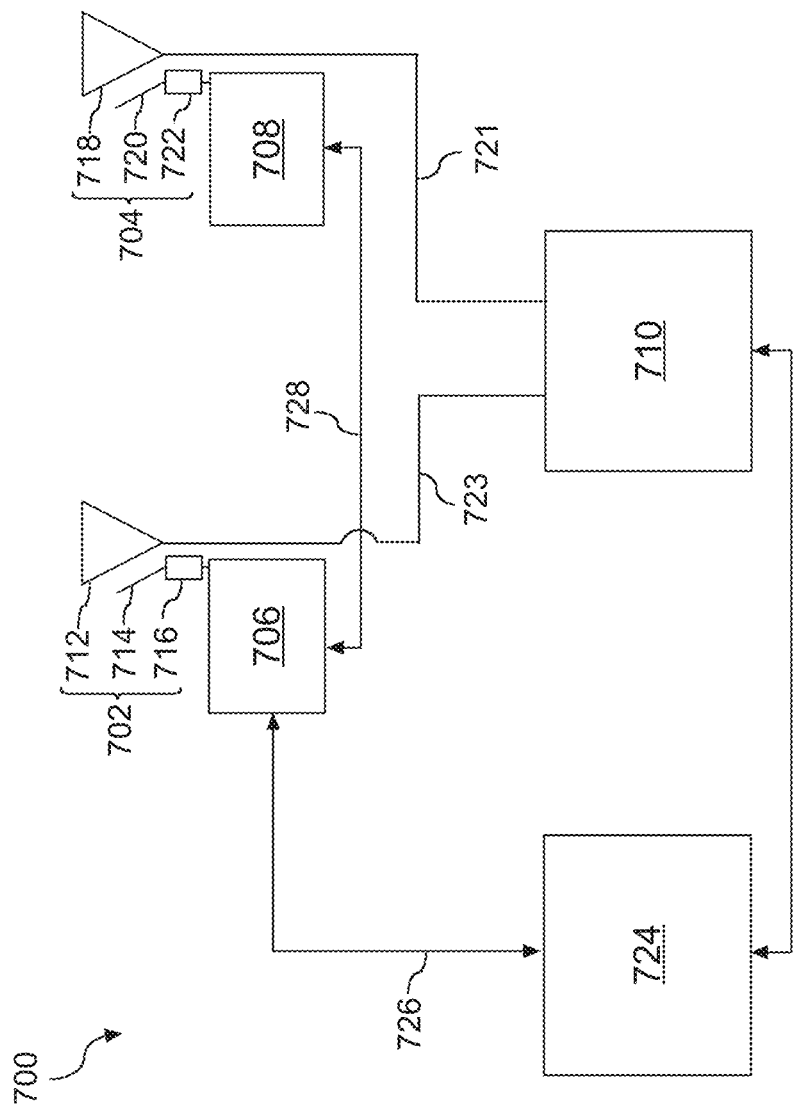

MOBILE COMPUTING DEVICE HAVING A MODAL ANTENNA

PRIORITY CLAIM

The present application claims the benefit of priority of U.S. Provisional Application Ser. No. 62/799,071, titled "Mobile Computing Device having a Modal Antenna," filed Jan. 31, 2019, which is incorporated herein by reference.

FIELD

Example aspects of the present disclosure relate generally to the field of antenna control, for instance, the control of modal antennas configured to operate in a plurality of different modes.

BACKGROUND

Modal antennas are being increasingly used in wireless communication, for instance in smartphone handsets. Such antennas generally provide improved signal quality and a more compact form factor than traditional passive antennas. One modal antenna configuration involves a parasitic element configured to alter a radiation pattern associated with a driven element. In such a configuration, a first transmission line may connect the driven element with a circuit configured to drive the driven element. A separate transmission line may connect a circuit configured to vary the modal properties of the modal antenna with the parasitic element.

SUMMARY

Aspects and advantages of embodiments of the present disclosure will be set forth in part in the following description, or may be learned from the description, or may be learned through practice of the embodiments.

Example aspects of the present disclosure are directed to a mobile computing device including a modal antenna. The mobile computing device may include a radio frequency circuit and a modal antenna mechanically coupled to a portion of the mobile computing at a location that is remote from the radio frequency circuit. The modal antenna may include a driven element and a parasitic element positioned proximate to the driven element. The modal antenna may be operable in a plurality of different modes. Each mode may be associated with a different radiation pattern. The mobile computing device may include a transmission line coupling the radio frequency circuit to the modal antenna. The radio frequency circuit may be configured to transmit an RF signal over the transmission line to the modal antenna and configured to communicate a control signal to adjust the mode of the modal antenna over the transmission line.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 7 illustrates a schematic diagram of an antenna system in which a control signal is transmitted over a control line that is separate from the transmission line to a modal antenna according to example embodiments of the present disclosure;

Figure 1A:
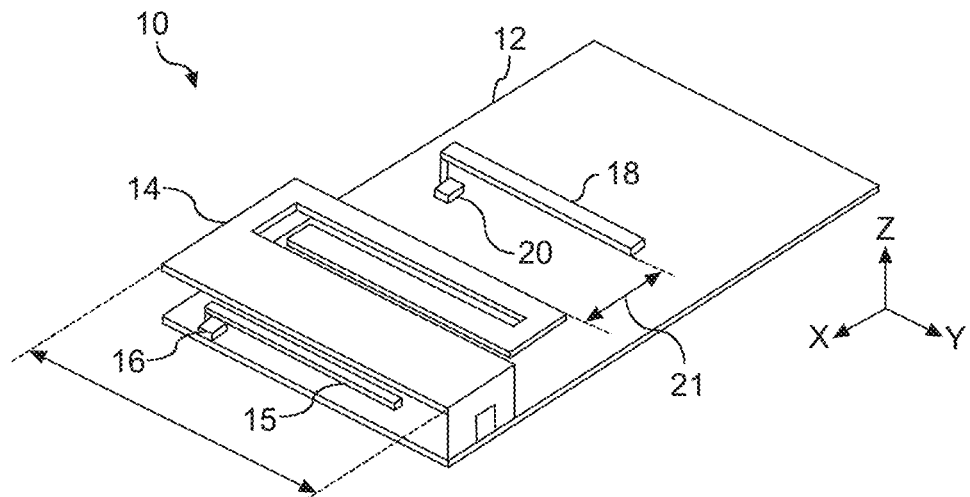
FIG. 1A illustrates an embodiment of a modal antenna 10 according to example embodiments of the present disclosure.

Repeat use of reference characters in the present specification and drawings is intended to represent same or analogous features or elements of the invention.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment.

Thus, it is intended that aspects of the present disclosure cover such modifications and variations.

Example aspects of the present disclosure are directed to systems and methods for controlling a modal antenna of a mobile computing device. A mobile computing device may include one or more modal antennas mechanically coupled (e.g., physically supported) to a member of the mobile computing device. The mobile computing device may include a radio frequency circuit and a modal antenna mechanically coupled to a portion of the mobile computing at a location that is remote from the radio frequency circuit. For example, the mobile computing device may be a laptop. The modal antenna(s) may be coupled to a hinge member of the laptop that is coupled to each of a main body and a display screen support member. In other embodiments, the modal antenna(s) may be coupled to the display support member, and the radio frequency circuit may be coupled to the main body. In yet other embodiments, the each of the modal antenna(s) and the radio frequency circuit may be coupled to the main body.

The modal antenna may include a driven element and a parasitic element positioned proximate to the driven element. The radio frequency circuit may be configured to alter an electrical characteristic of the parasitic element to operate the modal antenna in the plurality of different modes. The radio frequency circuit may be configured to transmit an RF signal over the transmission line to the modal antenna and adjust the mode of the modal antenna. The radio frequency circuit may be configured to communicate a control signal to adjust the mode of the modal antenna over the transmission line.

In some embodiments, the mobile computing device may include a display screen support member, a main body, and a hinge member pivotally coupled to each of the display screen support member and the main body. The modal antenna may be coupled to the hinge member.

In some embodiments, the mobile computing device may include an additional modal antenna coupled to the hinge member. The hinge member may be elongated in a longitudinal direction and may have a length in the longitudinal direction (or may include an elongated member elongated in a longitudinal direction). The modal antenna may be spaced apart from the additional modal antenna in the longitudinal direction by a spacing distance. A ratio of the length of the hinge member to the spacing distance may be less than about 3.

In some embodiments, the mobile computing device may include a laptop computer.

In some embodiments, the mobile computing device may include a main body and a display screen support member pivotally coupled to the main body. The modal antenna may be coupled to the display screen support member.

In some embodiments, the radiofrequency circuit may be coupled to the main body.

In some embodiments, the member may include a display screen support member including a display screen. The modal antenna may be coupled to the display screen support member in a bezel portion of the display screen support member that is between a perimeter of the display screen and a perimeter of the display screen support member.

In some embodiments, the mobile computing device may include a display screen support member and a main body pivotally coupled to the display screen support member. The modal antenna may be coupled to the main body.

In some embodiments, the mobile computing device may include an additional modal antenna. The display screen support member may be pivotable about a longitudinal direction with respect the main body. The main body may have a main body width in the longitudinal direction. The modal antenna may be spaced apart from the additional modal antenna in the longitudinal direction by a spacing distance. A ratio of the main body width to the spacing distance may be less than about 3.

In some embodiments, the transmission line may be a single coaxial cable.

In some embodiments, the radio frequency circuit may include a front end module that is configured to transmit the RF signal to the modal antenna and a control circuit that is configured to adjust the mode of the modal antenna.

In some embodiments, the mobile computing device may include a host processor. The radio frequency circuit may be configured to receive data from the host processor over a first connection for transmission via the RF signal and configured to receive control instructions over a second connection for adjusting the mode of the modal antenna. The second connection may be distinct from the first connection.

In some embodiments, the mobile computing device may include an additional transmission line and an additional modal antenna. The additional modal antenna may include a driven element and a parasitic element positioned proximate to the driven element. The additional modal antenna may be operable in a plurality of different modes. Each mode may be associated with a different radiation pattern. The radio frequency circuit may be configured to transmit an additional RF signal over the additional transmission line to the additional modal antenna and adjust the mode of the additional modal antenna.

In some embodiments, the mobile computing device may include a tuning circuit configured to control an electrical characteristic associated with the parasitic element of the modal antenna to operate the modal antenna in the plurality of different modes. The radio frequency circuit may include a control circuit that is configured to modulate a control signal onto the RF signal to generate a transmit signal for communication over the transmission line to the tuning circuit. The tuning circuit may be configured to demodulate the control signal such that the radio frequency circuit can adjust the mode of the modal antenna via the control signal.

In some embodiments, the mobile computing device may include an additional modal antenna including a driven element and a parasitic element positioned proximate to the driven element. The additional modal antenna may be operable in a plurality of different modes. Each mode may be associated with a different radiation pattern. An additional tuning circuit may be configured to control an electrical characteristic associated with the parasitic element of the additional modal antenna to operate the additional modal antenna in the plurality of different modes. An additional transmission line couple the radio frequency circuit to the additional modal antenna. The control circuit of the radio frequency circuit may be configured to modulate an additional control signal onto an additional RF signal to generate an additional transmit signal for communication over the additional transmission line to the additional tuning circuit. The additional tuning circuit may be configured to demodulate the additional control signal such that the radio frequency circuit can adjust a mode of the additional modal antenna via the additional control signal.

In some embodiments, the front end module may be configured to modulate the control signal onto the RF signal using amplitude-shift keying modulation.

Another example embodiment of the present disclosure is directed to a laptop computer including a hinge member, a main body pivotally coupled to the hinge member, and a display screen support member pivotally coupled to the hinge member. The laptop may include a radio frequency circuit. A modal antenna may be coupled to the hinge member and may include a driven element and a parasitic element positioned proximate to the driven element. The modal antenna may be operable in a plurality of different modes. Each mode may be associated with a different radiation pattern. The laptop may include a transmission line coupling the radio frequency circuit to the modal antenna. The radio frequency circuit may be configured to transmit an RF signal to the modal antenna over the transmission line and configured to adjust the mode of the modal antenna.

In some embodiments, the radio frequency circuit may be configured to modulate a control signal onto the RF signal to generate a transmit signal for communication over the transmission line to adjust the mode of the modal antenna via the control signal.

In some embodiments, the laptop computer may include a tuning circuit configured to control an electrical characteristic associated with the parasitic element of the modal antenna to operate the modal antenna in the plurality of different modes. The radio frequency circuit may include a control circuit that is configured to modulate a control signal onto the RF signal to generate a transmit signal for communication over the transmission line to the tuning circuit. The tuning circuit may be configured to demodulate the control signal such that the radio frequency circuit can adjust the mode of the modal antenna via the control signal.

In some embodiments, the laptop computer may include a host processor, a tuning circuit configured to control an electrical characteristic associated with the parasitic element of the modal antenna to operate the modal antenna in the plurality of different modes, and an additional modal antenna. The laptop computer may include an additional tuning circuit configured to control an electrical characteristic associated with the parasitic element of the additional modal antenna to operate the additional modal antenna in the plurality of different modes. A control line may couple the host processor to the tuning circuit. An additional control line may couple the tuning circuit to the additional tuning circuit. The host processor may be configured to transmit each of a control signal and an additional control signal over the control line to the tuning circuit. The tuning circuit may be configured to transmit the additional control signal over the additional control line to the additional tuning circuit.

In some embodiments, the laptop computer may include an additional modal antenna coupled to the hinge member. The display screen support member may be pivotable about a longitudinal direction with respect the hinge member. The hinge member may be elongated in a longitudinal direction and may have length in the longitudinal direction. The modal antenna may be spaced apart from the additional modal antenna in the longitudinal direction by a spacing distance. A ratio of the length of the hinge member to the spacing distance may be less than about 3.

In some embodiments, the laptop computer may include an additional modal antenna coupled to the hinge member and operatively connected with the radio frequency circuit. The additional modal antenna may include a driven element and a parasitic element positioned proximate to the driven element. The additional modal antenna may be operable in a plurality of different modes. Each mode may be associated with a different radiation pattern. The radio frequency circuit may be configured to transmit an additional RF signal to the additional modal antenna and adjust the mode of the additional modal antenna.

In some embodiments, the laptop computer may include a tuning circuit configured to control an electrical characteristic associated with the parasitic element of the modal antenna to operate the modal antenna in the plurality of different modes. A transmission line may couple the radio frequency circuit to the modal antenna. The radio frequency circuit may be configured to modulate a control signal onto the RF signal to generate a transmit signal for communication over the transmission line to the tuning circuit. The tuning circuit may be configured to demodulate the control signal such that the radio frequency circuit can adjust the mode of the modal antenna via the control signal.

Another example embodiment of the present disclosure is directed to a hinge member for a laptop that is configured to pivotally couple a main body member with a display screen support member of the laptop. The hinge member may include a first modal antenna coupled to the hinge member. The first modal antenna may include a driven element and a parasitic element positioned proximate to the driven element. The modal antenna may be operable in a plurality of different modes. Each mode may be associated with a different radiation pattern. A second modal antenna may be coupled to the hinge member, the second modal antenna comprising a driven element and a parasitic element positioned proximate to the driven element, the modal antenna operable in a plurality of different modes, each mode associated with a different radiation pattern. The first modal antenna may be spaced apart from the second modal antenna.

FIG. 1A illustrates an embodiment of a modal antenna 10 in accordance with aspects of the present disclosure. The modal antenna 10 may include a circuit board 12 (e.g., including a ground plane) and a driven antenna element 14 disposed on the circuit board 12. A first parasitic element 15 may be positioned proximate the driven antenna element 14. For example, the first parasitic element 15 may be positioned such that current in the first parasitic element 15 affects the radiation pattern of the driven element. For instance, an antenna volume may be defined between the circuit board (e.g., and the ground plane) and the driven antenna element 14. The first parasitic element 15 may be positioned at least partially within the antenna volume.

A first active tuning element 16 may be coupled with the parasitic element 15. The first active tuning element 16 can be a passive or active component or series of components and may be configured to alter a reactance on the first parasitic element 14 either by way of a variable reactance, or shorting to ground, resulting in a frequency shift of the antenna.

In some embodiments, a second parasitic element 18 may be disposed adjacent the circuit board 12 and proximate the driven element 14 such that current in the second parasitic element 18 affects the radiation pattern of the driven element. The second parasitic element 18 may be positioned outside of the antenna volume. The driven element 14 may have a width 19. The second parasitic element 18 may be spaced apart from the driven element 14 by a spacing distance 21. A ratio of the width 19 of the driven element 14 to the spacing distance 21 may range from about 0.2 to about 10, in some embodiments from about 0.5 to about 8, and in some embodiments from about 1 to about 5.

The second parasitic element 18 may further include a second active tuning element 20 which may individually include one or more active and/or passive components. The second parasitic element 18 may be positioned adjacent the driven element 14 and may also be positioned outside of the antenna volume.

The described configuration may provide an ability to shift the radiation pattern characteristics of the driven antenna element by varying a reactance thereon. Shifting the antenna radiation pattern can be referred to as "beam steering". In instances where the antenna radiation pattern comprises a null, a similar operation can be referred to as "null steering" since the null can be shifted to an alternative position about the antenna (e.g., to reduce interference). In some embodiments, the second active tuning element 20 may include a switch for connecting the second parasitic to ground when "On" and for terminating the short when "Off". It should however be noted that a variable reactance on either of the first or second parasitic elements, for example by using a variable capacitor or other tunable component, may further provide a variable shifting of the antenna pattern or the frequency response. For example, the first active tuning element 16 and/or second active tuning element 18 may include at least one of a tunable capacitor, MEMS device, tunable inductor, switch, a tunable phase shifter, a field-effect transistor, or a diode.

Figure 1B:
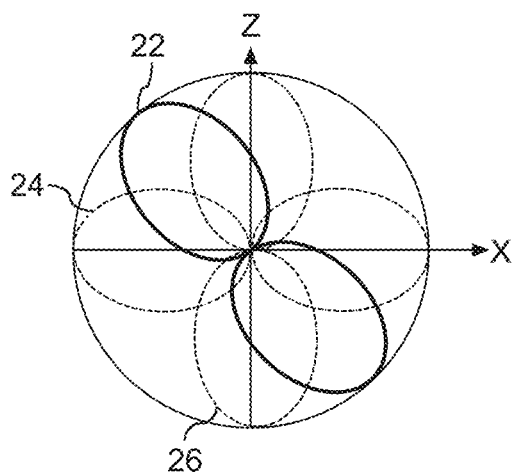
FIG. 1B illustrates a two-dimensional antenna radiation pattern associated with the modal antenna of FIG. 1A.

FIG. 1B illustrates a two-dimensional antenna radiation pattern associated with the modal antenna of FIG. 1A. The radiation pattern may be shifted by controlling an electrical characteristic associated with at least one of the first and second parasitic elements 16, 18 of the modal antenna 10. For example, in some embodiments, the radiation pattern may be shifted from a first mode 22 to a second mode 24, or a third mode 26.

Figure 1C:
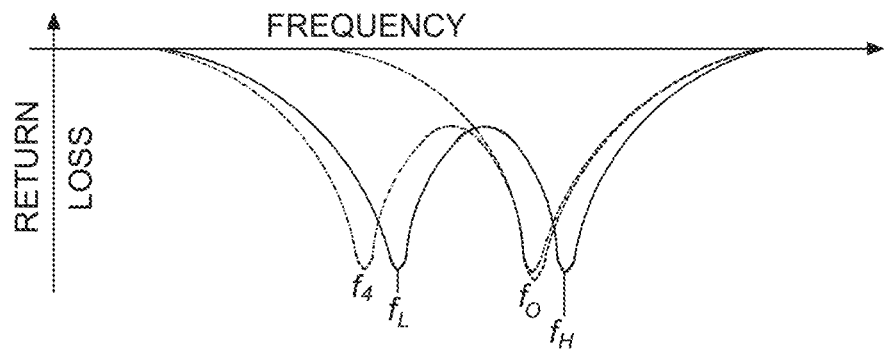
FIG. 1C illustrates an example frequency plot of the modal antenna of FIG. 1A according to example embodiments of the present disclosure.

FIG. 1C illustrates an example frequency plot of the modal antenna of FIG. 1A according to some aspects of the present disclosure. The frequency of the antenna can be shifted by controlling an electrical characteristic associated with at least one of the first or second parasitic elements 16, 18 of the modal antenna 10. For example, a first frequency ($f_0$) of the antenna may be achieved when the first and second parasitic elements are switched "Off"; the frequencies ($f_L$) and ($f_H$) may be produced when the second parasitic is shorted to ground; and the frequencies ($f_4$; $f_0$) may be produced when the first and second parasitic elements are each shorted to ground. It should be understood that other configurations are possible within the scope of this disclosure. For example, more or fewer parasitic elements may be employed. The positioning of the parasitic elements may be altered to achieve additional modes that may exhibit different frequencies and/or combinations of frequencies.

FIGS. 1A-IC depict one example modal antenna having a plurality of modes for purposes of illustration and discussion. Those of ordinary skill in the art, using the disclosures provided herein, will understand that other modal antennas and/or antenna configurations can be used without deviating from the scope of the present disclosure. As used herein a "modal antenna" refers to an antenna capable of operating in a plurality of modes where each mode is associated with a distinct radiation pattern.

Figure 2:
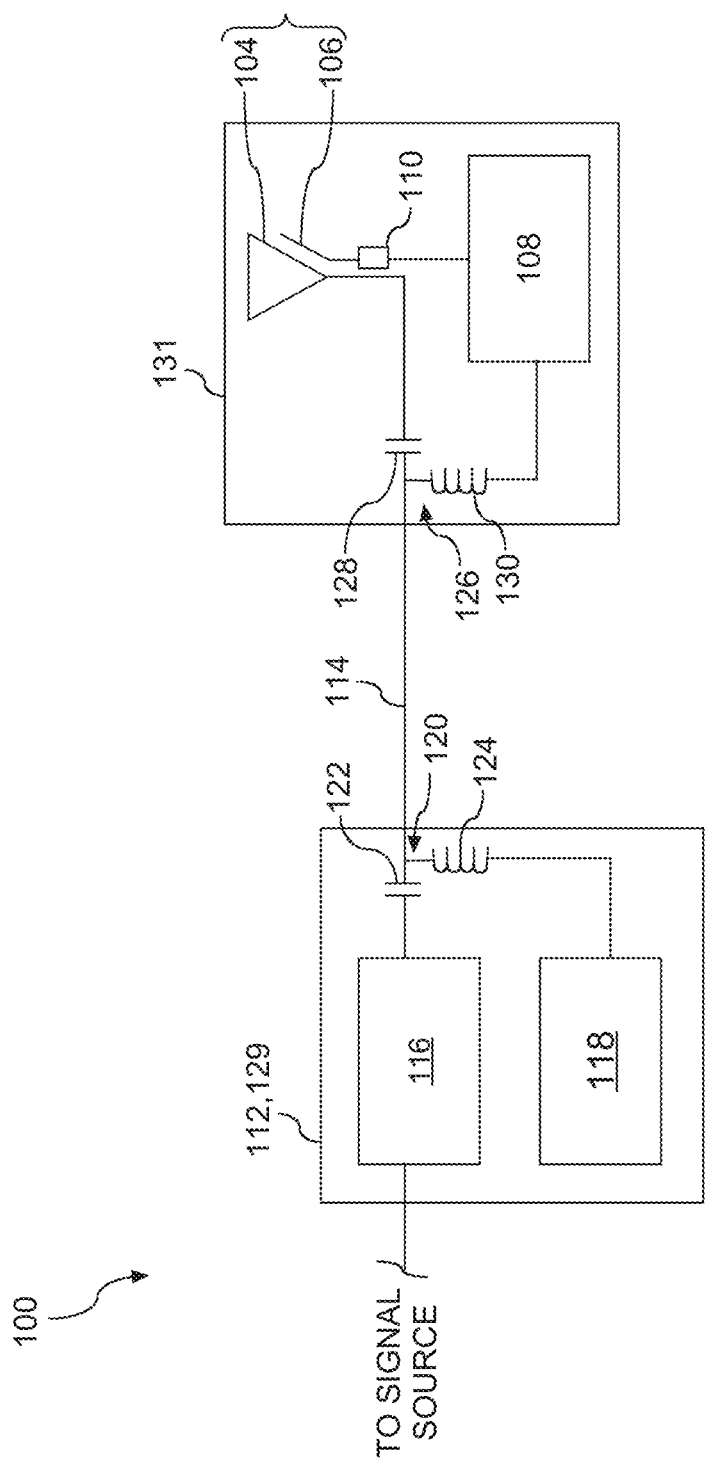
FIG. 2 illustrates a schematic diagram of an example antenna system according to example embodiments of the present disclosure.

FIG. 2 illustrates a schematic diagram of an embodiment of an antenna system 100 in accordance with example aspects of the present disclosure. The antenna system 100 may include a modal antenna 102. The modal antenna 102 may include a driven element 104 and a parasitic element 106 positioned proximate to the driven element 104. The modal antenna 102 may be operable in a plurality of different modes, and each mode may be associated with a different radiation pattern, for example as described above with reference to FIGS. 1A through 1C.

A tuning circuit 108 may be configured to control an electrical characteristic associated with the parasitic element 106 to operate the modal antenna 102 in the plurality of different modes. The tuning circuit 108 may be configured demodulate a control signal from a transmit signal and control the electrical characteristic of the parasitic element 106 based on control instructions associated with the control signal, for example as explained in greater detail with reference to FIGS. 4 and 5.

A tunable component 110 may be coupled with the parasitic element 106, and the tuning circuit 108 may be configured to control the tunable component 110 to alter the electrical connectivity of the parasitic element 106 with a voltage or current source or sink, such as connecting the parasitic element 106 with ground.

A radio frequency circuit 112 may be configured to transmit an RF signal to the driven element 104 of the modal antenna 102. For example, a transmission line 114 may couple the radio frequency circuit 112 to the modal antenna 102. In some embodiments, the transmission line 114 may be a single coaxial cable. The radio frequency circuit 112 may be configured to amplify or otherwise generate the RF signal, which is transmitted through the transmission line 114 (as a component of the transmit signal) to the driven element 104 of the modal antenna 102.

In some embodiments, the radio frequency circuit 112 may include a front end module 116 and/or a control circuit 118. The front end module 116 may be configured to generate and/or amplify the RF signal that is transmitted to the driven element 104. The control circuit 118 may be configured to modulate a control signal onto the RF signal using a variety of suitable modulation techniques. For example, in some embodiments the control circuit 118 may be configured to modulate a control signal onto the RF signal using the using amplitude-shift keying modulation to generate the transmit signal, for example as explained in greater detail below with reference to FIG. 4.

The transmission line 114 may be coupled with various components (e.g., using Bias Tee circuits) that are configured to aid in the combination and/or separation of signals occupying various frequency bands. For example, a first Bias Tee circuit 120 may couple the front end module 116 and the control circuit 118 with the transmission line 114. The first Bias Tee circuit 120 may include a capacitor 122 coupling the transmission line 114 with front end module 116 and an inductor 124 coupling the control unit 118 with the transmission line 114. A second Bias Tee circuit 126 may couple the driven element 104 and the tuning circuit 108 with the transmission line 114. The second Bias Tee circuit 126 may include a capacitor 128 coupling the transmission line 114 with the driven element 104 and an inductor 130 coupling the transmission line 114 with the tuning circuit 108.

The front end module 116 may transmit the RF signal through the capacitor 122 of the first Bias Tee circuit 120. The control circuit 118 may modulate the control signal onto the RF signal through the inductor 124 of the first Bias Tee circuit 120 to generate the control signal in the transmission line 114. The tuning circuit 108 may de-modulate the control signal from the transmit signal via the inductor 130 of the second Bias Tee circuit 126. The RF signal component of the transmit signal may be transmitted to the driven element 104 of the modal antenna 102 via the capacitor 128 of the second Bias Tee circuit 126.

In some embodiments, the antenna system 100 may include a first circuit board 129 and a second circuit board 131 that is physically separate from the first circuit board 129. The radio frequency circuit 112 may be disposed on the first circuit board 129, and at least one of the tuning circuit 108 or modal antenna 102 may be disposed on the second circuit board 131. This may allow radio frequency circuit 112 to be physically separated from the tuning circuit and/or modal antenna 102 without employing multiple transmission lines or adversely affecting the operation of the antenna system 100.

In some embodiments, the RF signal may be defined within a first frequency band, and the control signal may be defined within a second frequency band that is distinct from the first frequency band. For example, the first frequency band may range from about 500 MHz to about 50 GHz, in some embodiments from about 1 GHz to about 25 GHz, in some embodiments from about 2 GHz to about 7 GHz, e.g., about 5 GHz. The second frequency band may range from about 10 MHz to about 1 GHz, in some embodiments from about 20 MHz to about 800 MHz, in some embodiments from about 30 MHz to about 500 MHz, in some embodiments from about 50 MHz to about 250 MHz, e.g., about 100 MHz.

Figure 3:
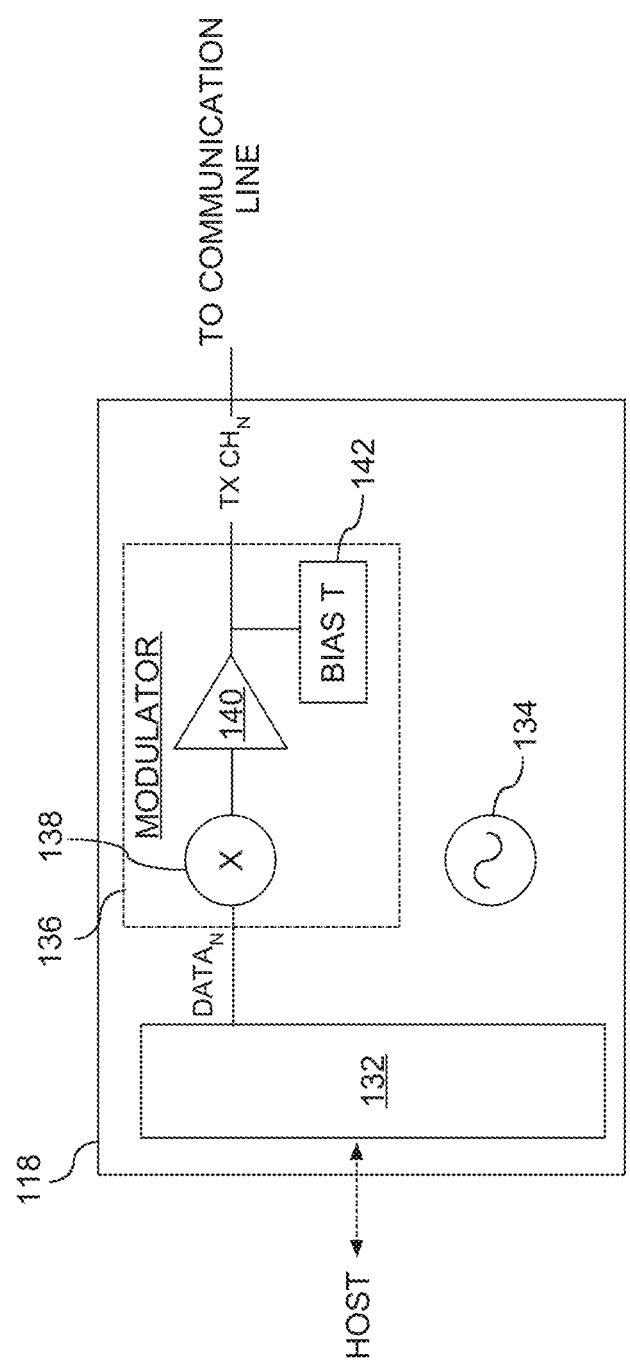
FIG. 3 illustrates a schematic diagram of an example control circuit of the antenna system according to example embodiments of the present disclosure.

FIG. 3 illustrates a schematic diagram of one embodiment of the control circuit 118 of the antenna system 100 illustrated in FIG. 2. The control circuit 118 may include a processor 132, and the processor 132 may be configured to generate or receive control instructions for changing the mode of the modal antenna 102 (illustrated in FIG. 2), or otherwise adjusting the orientation or frequency of the radiation pattern of the modal antenna 102. For example, the processor 132 may receive the control instructions from another processor (represented by HOST in FIG. 3) and may generate an output that contains data (represented by DATA$_N$ in FIG. 3) that describes the instructions. The data may have any suitable bit depth. For example, in some embodiments the data may be in binary format. In other embodiments, the data may be in hexadecimal format, decimal format, etc.

The control circuit 118 may also include a carrier signal source 134. In some embodiments, the carrier signal source 134 may be configured to generate a carrier signal that includes a sinusoidal wave, which may have a generally constant frequency. In other embodiments, the carrier signal may be or include any suitable signal. For example, in some embodiments, the carrier signal may be or include any suitable repeating pattern, and is not limited to being sinusoidal or having a generally constant frequency.

The control circuit 118 may also include a modulator 136 that is configured to modulate the output of the processor onto the carrier signal to produce the control signal (represented by TX CH$_N$ in FIG. 3). The modulator 136 may include a multiplexer 138 that is configured to combine the output containing the data (represented by DATA$_N$ in FIG. 3), which may describe the control instructions, with the carrier signal from the carrier signal source 134. For example, the modulator 136 may be configured to scale the amplitude of the carrier signal from the carrier signal source 134 to produce the control signal, for example by performing amplitude shift keying modulation (e.g., on-off keying modulation), for example as described in greater detail below with reference to FIG. 4. The modulator 136 may also include an amplifier 140 and a Bias Tee circuit 142.

Figure 4:
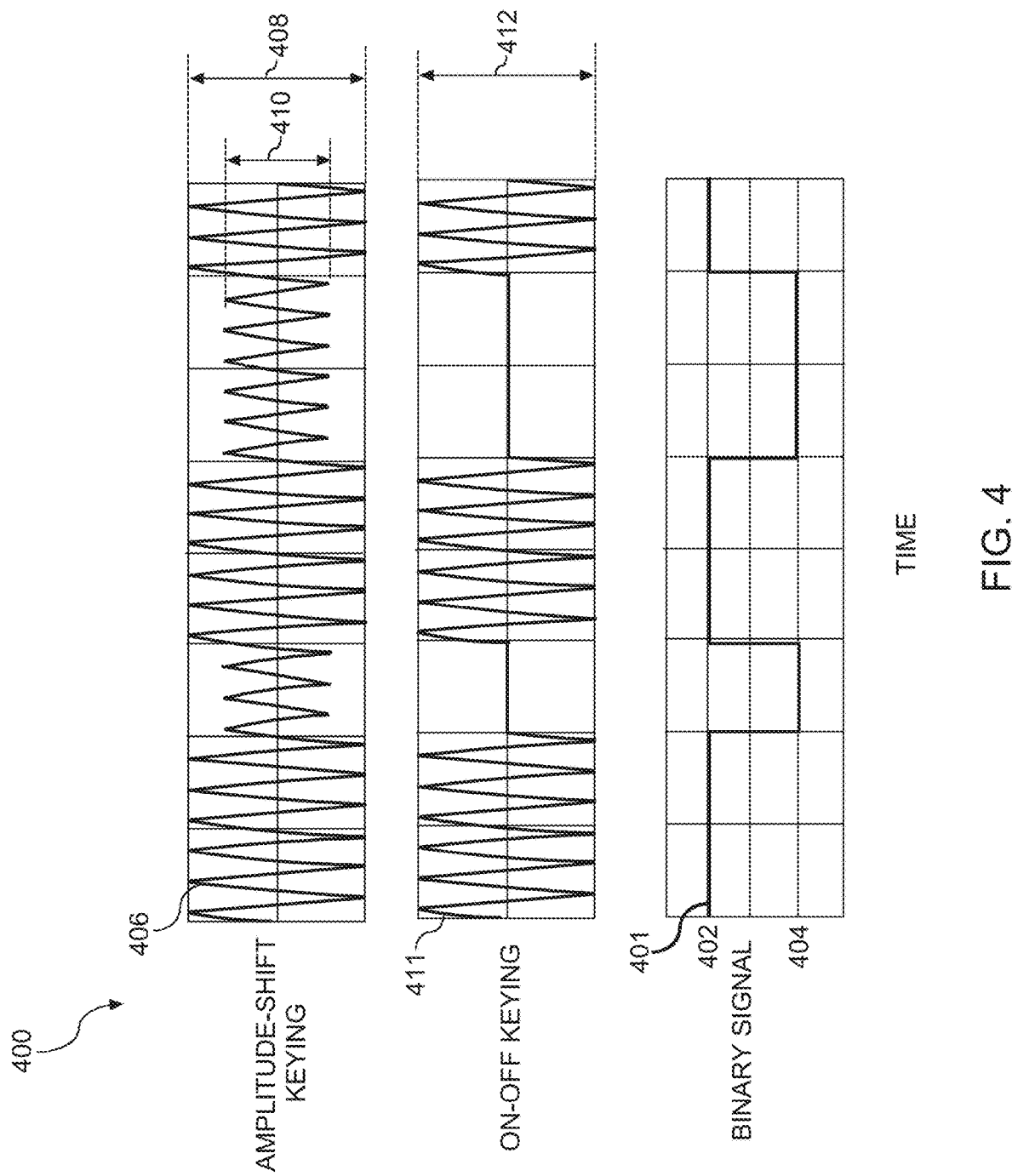
FIG. 4 illustrates a series of time-aligned charts representing simplified examples of amplitude-shift keying modulation and on-off keying modulation.

FIG. 4 illustrates a series of time-aligned charts 400 representing simplified examples of amplitude-shift keying modulation and on-off keying modulation. A binary signal 401 may alternate between a first voltage level 402 and a second voltage level 404 in a manner that describes the binary data set. The binary signal 401 may correspond to a simplified example of the output of processor 132, which may contain the data describing the control instructions, for example as described above with reference to FIG. 3.

Amplitude-shift keying modulation may include representing the binary signal 401 by representing the first voltage level 402 as a sinusoidal signal 406 having a varying amplitude. For example, the sinusoidal signal 406 may have a first amplitude 408 that represents the first voltage 402 of the binary signal 401, and may have a second amplitude 410 that represents the second voltage level 404 of the binary signal 401.

On-off keying modulation is a type of amplitude-shift keying modulation. In on-off keying modulation, the binary signal 401 may be represented by a sinusoidal signal 411 having a varying amplitude. The sinusoidal signal 411 may have a first amplitude 412 that represents the first voltage level 402 of the binary signal 401. However, the second voltage level 404 may be represented by an absence of the sinusoidal signal 406. In other words, the sinusoidal signal 406 may have an amplitude of about zero to represent the second voltage 404 of the binary signal 401.

Figure 5:
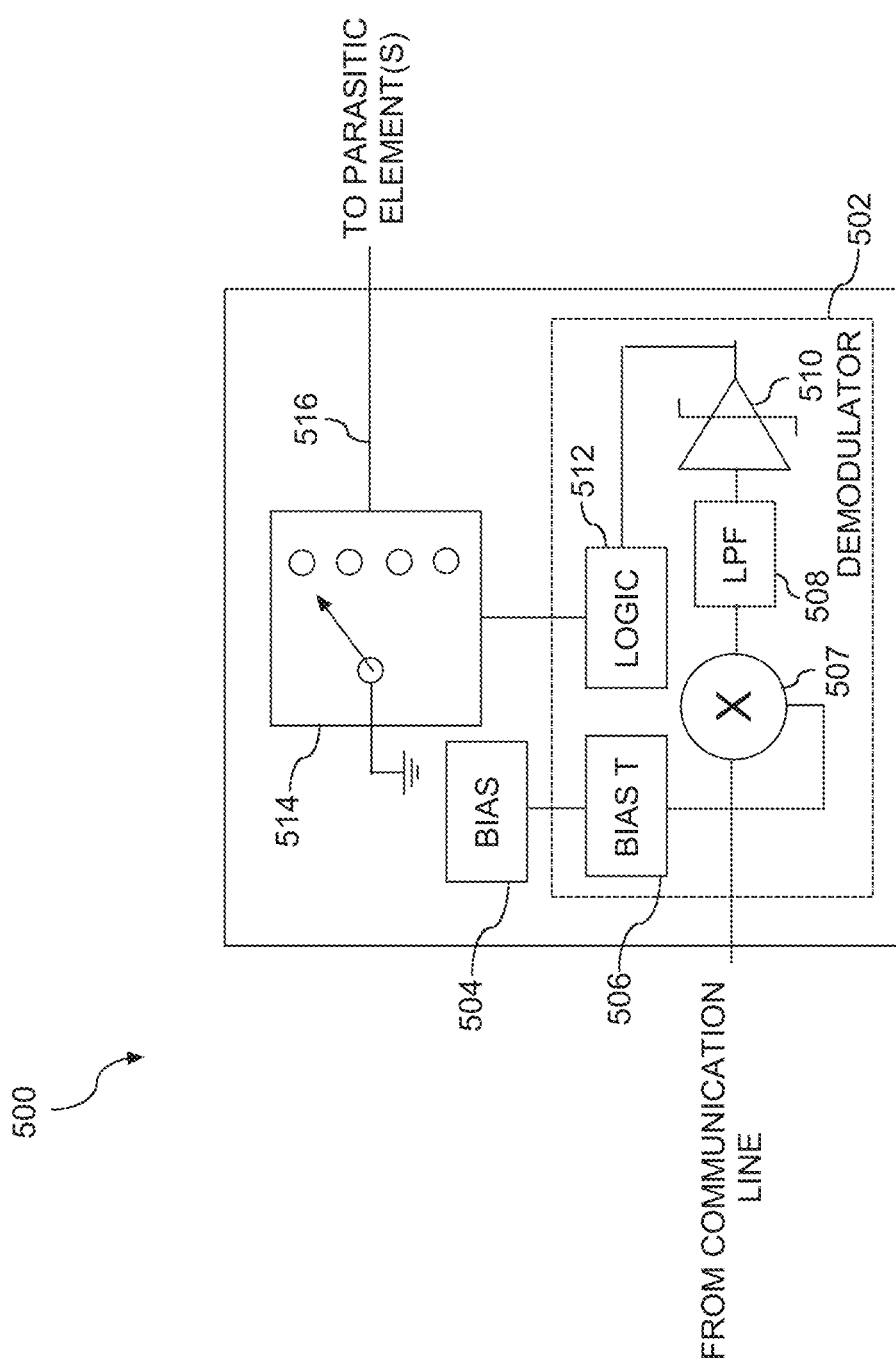
FIG. 5 illustrates a schematic diagram of an example tuning circuit of the antenna system according to example embodiments of the present disclosure.

FIG. 5 illustrates a schematic diagram of one embodiment of the tuning circuit 500, for example corresponding to the tuning circuit 108 discussed above with reference to FIG. 3, in accordance with aspects of the present disclosure. The tuning circuit 500 may include a demodulator 502 and a bias 504. The demodulator 502 may include a Bias Tee circuit 506 coupled with the bias 504, and multiplexer 507 that is coupled with the communication line 114 (illustrated in FIG. 2).

The tuning circuit 500 may also include a low pass filter 508 that is configured to filter at least one frequency band. For example, the low pass filter 508 may be configured to filter at least one frequency band that is higher than the frequency of the carrier signal frequency. As such, the low pass filter 508 may isolate or relatively increase the strength of the carrier signal frequency. The demodulator 502 may also include a diode 510, such as a zenner diode. The diode 510 may be coupled with a logic circuit 512 that is configured to interpret the control instructions associated with (e.g., contained within) the control signal.

The logic circuit 512 (e.g., processors, ASICS, etc. configured to execute computer-readable instructions to implement logic operations) may also be configured to control the operation of a switch 514 based on the control instructions associated with (e.g., contained within) the control signal. The switch 514 may be connected with ground and be configured to switch between a plurality of states. For example, the switch 514 may be configured to selectively connect an output 516 of the switch 514 with ground or otherwise vary the electrical connectivity of the output 516 to control an electrical characteristic associated with the parasitic element 106 (illustrated in FIG. 2) and operate the modal antenna in the plurality of different modes. For example, the switch 514 may be configured to adjust the operation of the tunable component 110 (illustrated in FIG. 2) to alter the electrical connectivity of the parasitic element 106 with a source or sink (e.g., a voltage source/sink or current source/sink), For example, the switch 514 may be configured to selectively connect the parasitic element 106 with ground.

Frequency drift, which is the relative difference between two clock frequencies, may develop between a local clock frequency that is associated with the tuning circuit 108, 500 and a clock frequency (e.g., a master clock frequency) associated with the control circuit 118. To minimize frequency drift, the tuning circuit 108, 500 may be configured to synchronize the local clock frequency with the master clock frequency.

As an example, a first clock frequency may be associated with the transmit signal, and the tuning circuit 500 may be configured to synchronize the local clock frequency associated with the tuning circuit 500 with the first frequency. The first clock frequency may correspond to (e.g., be equal to or be a multiple of) a frequency of the carrier signal that is generated by the sinusoidal wave source 134 or another harmonic source associated with the control circuit 118. For instance, the first clock frequency may be present in portions of the control signal that have a non-zero amplitude.

The tuning circuit 500 (e.g., the logic circuit 512) may include a tunable frequency source, such as a local tunable harmonic oscillator (e.g., a ring oscillator) configured to provide the local clock frequency associated with the tuning circuit 500. The logic circuit 512 may be configured to sample the signal received by the logic circuit 512 (e.g., from the diode 510) and perform a frequency search operation with respect to the signal. The frequency search operation may determine an appropriate sampling frequency. For example, the logic circuit 512 may sample the control signal (or a conditioned version thereof that is output by the diode 510) for a time period corresponding to an expected phrase. The expected phrase may include a signal pattern that is expected to be present in the control signal. As an example, the expected phrase may present at the beginning and/or end of one or more transmitted data "frames" as a "preamble" or "postamble". The logic circuit 512 may be configured to recognize or detect the expected phrase to locate the beginning and/or end of the frame(s). The logic circuit 512 may then determine a phase error measured in terms of the number of local oscillator "clock edges" present in the sample compared with a number of local oscillator "clock edges" expected to be present in the sample based on the expected phrase.

The logic circuit 512 may then perform the frequency search operation. For example, the frequency search operation may include repeating the steps of (1) sampling for a time period corresponding to the length of the expected phrase, (2) determining a phase error by comparing the number of clock edges present in the sample with the number of expected clock edges, and (3) adjusting the local clock frequency (e.g., frequency of the local oscillator) until the local clock frequency is sufficiently synchronized with the master clock frequency associated with the control circuit 118. For example, the local clock frequency may be determined to be sufficiently synchronized when the phase error is less than a threshold (e.g., a predetermined threshold value).

In some embodiments, the tuning circuit may employ a numerically controlled oscillator that is configured to count data edge transitions of the signal received by the tuning circuit. If the number of data edge transitions fall outside of an expected range (e.g., a predetermined range), the tuning circuit may reject or ignore the associated data frame. If the count of data edge transitions falls within the expected range, the tuning circuit may adjust a frequency associated with an internal oscillator of the tuning circuit (e.g., the local clock frequency). For example, the tuning circuit may be configured to increase or decrease the internal oscillator frequency to compensate for drift between the frequency of the internal oscillator frequency of the tuning circuit and a clock or oscillator frequency associated with the RF circuit and/or control circuit, which may occur during normal operation.

Figure 6:
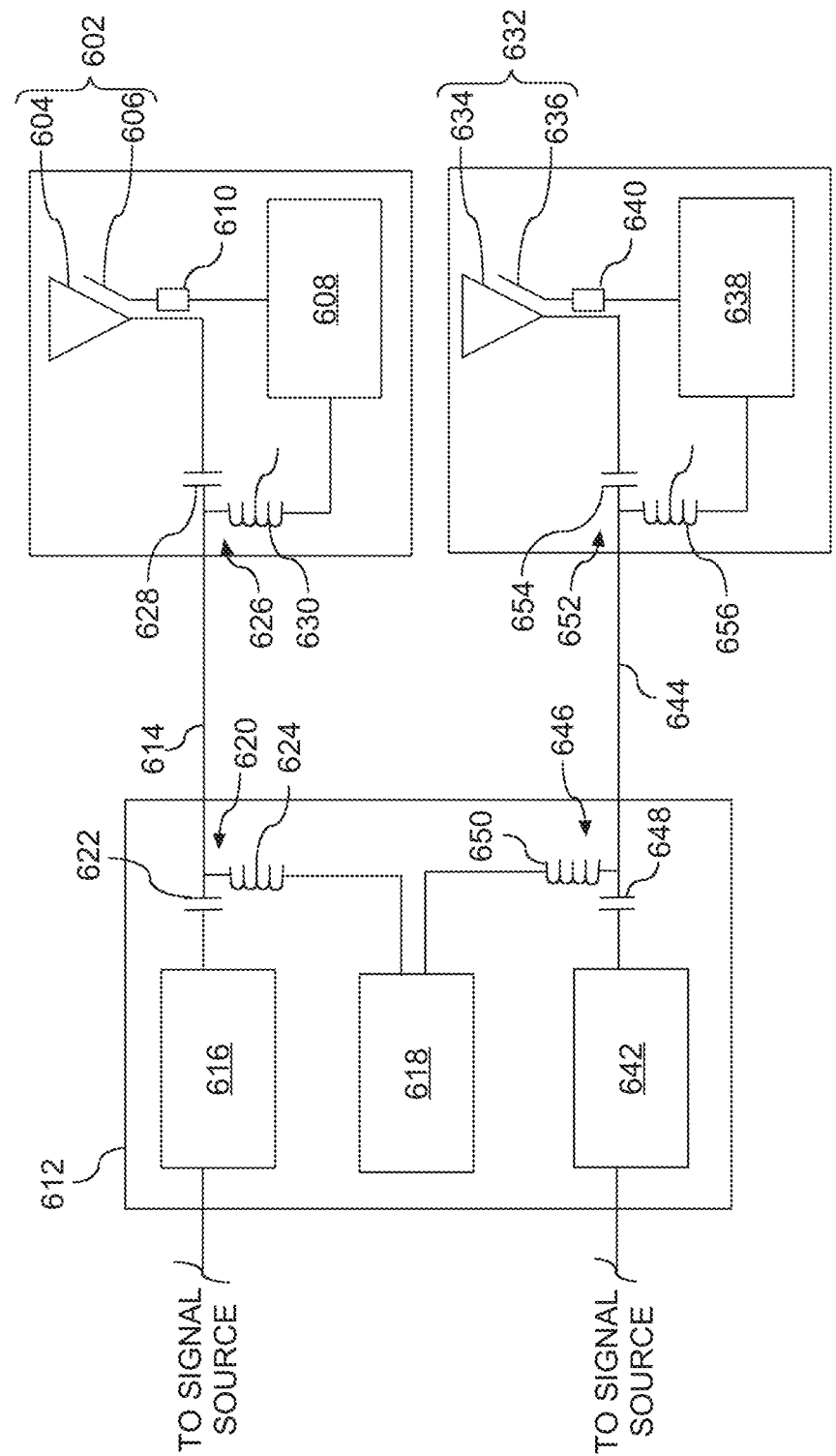
FIG. 6 illustrates a schematic diagram of an antenna system in which a control signal is modulated onto an RF signal and transmitted over a transmission line to a modal antenna according to example embodiments of the present disclosure.

FIG. 6 illustrates another embodiment a schematic diagram of an embodiment of an antenna system 600 in accordance with aspects of the present disclosure. The antenna system 600 may be generally similarly configured to the antenna system 100 described above with reference to FIG. 2. For example, the antenna system 600 may include a modal antenna 602 including a driven element 604 and parasitic element 606, a tuning circuit 608, an RF circuit 612, a transmission line 614, front end module 616, control circuit 618, a first Bias Tee circuit 620 including a capacitor 622 and inductor 624, and a second Bias Tee circuit 626 including a capacitor 628 and inductor 630.

The antenna system 600 may also include a second modal antenna 632 including a driven element 634 and a parasitic element 636. A second tuning circuit 638 may be configured to control an electrical characteristic associated with the parasitic element 636 to operate the modal antenna 632 in the plurality of different modes. For example, a second tunable component 640 may be coupled with the parasitic element 636, and the tuning circuit 638 may be configured to control the second tunable component 640 to alter the electrical connectivity of the parasitic element 636 of the second modal antenna 632 with a voltage or current source or sink, such as connecting the parasitic element 106 with ground.

The radio frequency circuit 612 may include a second front end module 642 and a second transmission line 644. The second front end module 642 may be configured to generate and/or amplify a second RF signal. The control circuit 618 may be configured to modulate a second control signal onto the second RF signal to generate a second transmit signal. In some embodiments, the control circuit 618 may modulate the second control signal onto the second RF signal using amplitude-shift keying modulation, for example as explained above with reference to FIGS. 3 and 4.

The second transmission line 644 may be coupled with various components using Bias Tees configured to aid in the combination and/or separation of signals occupying various frequency bands. For example, a third Bias Tee circuit 646 may couple the second front end module 642 and the control circuit 618 with the second transmission line 644. The third Bias Tee circuit 646 may include a capacitor 648 coupling the second front end module 642 with the second transmission line 644 and an inductor 650 coupling the control unit 618 with the second transmission line 644.

A fourth Bias Tee circuit 652 may couple the second transmission line 644 with the driven element 634 of the second modal antenna 632 and the tuning circuit 108. The fourth Bias Tee circuit 652 may include a capacitor 654 coupling the second transmission line 644 with the driven element 634 of the second modal antenna 632 and an inductor 656 coupling the second transmission line 644 with the second tuning circuit 638.

The second front end module 642 may transmit the second RF signal through the capacitor 648 of the third Bias Tee circuit 646. The control circuit 618 may modulate the second control signal onto the second RF signal through the inductor 650 of the third Bias Tee circuit 646 to generate the second transmit signal. The second tuning circuit 638 may de-modulate the control signal from the second transmit signal via the inductor 656 of the fourth Bias Tee circuit 652. The RF signal component of the second transmit signal may be transmitted to the driven element 634 of the second modal antenna 632 via the capacitor 654 of the fourth Bias Tee circuit 652.

In this embodiment, the control circuit 618 may have a separate output associated with each of the transmission lines 614, 644. The control circuit 618 may be similarly configured as the control circuit 118 described above with reference to FIG. 3 and may include additional or components configured to provide the separate output for the second transmission line 644. For example, the control circuit 618 may include a second processor 132, sinusoidal wave source 134, modulator 136, multiplexer 138, amplifier 140 and/or Bias Tee circuit 142 such that a second output is provided.

In some embodiments, the antenna system may include a plurality of antennas in a multiple-in-multiple-out (MIMO) configuration. Multiple pairs of control circuits and tuning circuits may be configured to control multiple modal antennas as well as multiple passive antennas. For example, the antenna system may include N tuning circuits (each paired with a respective control circuit) configured to control the operation of M modal antennas and (N−M) passive antennas, where N and M are each positive integers, and where N is greater than or equal to M. Additionally, in some embodiments, one control circuit may include multiple outputs and be paired with multiple tuning circuits, for example as described with reference to FIG. 6. In any event, the number of tuning circuits, N, may range up to any suitable number. For example, in some embodiments, N may range from 2 to 20, or greater. M may also range from 2 to 20, or greater.

It should be understood that many variations are possible within the scope of this disclosure. For example, in other embodiments, a separate control circuit may be associated with the each transmission line 614, 644. Additionally, in other embodiments, a single front end module may be configured to generate the respective RF signals. In some embodiments, a single tuning circuit may be configured to control an electrical characteristic associated with a parasitic element of each modal antenna of the system. Moreover, in some embodiments, the system may include more than two modal antennas. Additionally, in some embodiments, the system may include a combination of one or more modal antennas and one or more non-modal or passive antennas that are not configured to operate in a plurality of modes. In some embodiments, one or more modal antennas may include more than one parasitic element. A single control circuit may be configured to adjust respective tunable elements associated with the parasitic elements to control electrical characteristics associated with the parasitic elements and operate the modal antenna in the plurality of different modes. In other embodiments, multiple control circuits may be used to respectively adjust the tunable elements. It should be understood that yet other variations, modification, combinations, and the like are possible with the scope of this disclosure.

FIG. 7 depicts another embodiment of an antenna system 700 according to aspects of the present disclosure. The antenna system 700 may include a first modal antenna 702, a second modal antenna 704 (e.g., an additional modal antenna), a first tuning circuit 706 and a second tuning circuit 708, and an RF circuit 710. The first modal antenna 702 may include a driven element 712, a parasitic element 714, and a tunable component 716. The second modal antenna 704 may include a driven element 718, a parasitic element 720, and a tunable component 722. The RF circuit 710 may be configured to communicate a first RF signal to the first modal antenna 702 via a first transmission line 721. The RF circuit 710 may be configured to communicate a second RF signal to the second modal antenna 704 via a second transmission line 723.

The antenna system 700 may include a host processor 724 (e.g., a central processing unit) and a control line 726 coupling the host processor 724 to the first tuning circuit 706. An additional control line 728 may couple the first tuning circuit 706 to the second tuning circuit 708. The host processor 724 may be configured to transmit each of a control signal and an additional control signal over the control line 726 to the first tuning circuit 706. The first tuning circuit 706 may be configured to control an electrical characteristic associated with the parasitic element 714 of the modal antenna 702 (e.g., using the tunable component 716) to operate the modal antenna 702 in the plurality of different modes of the modal antenna 702 based on the control signal. The first tuning circuit 706 may be configured to transmit the additional control signal over the additional control line 728 to the second tuning circuit 708. The additional control circuit 708 may be configured to control an electrical characteristic associated with the parasitic element 720 of the additional modal antenna 704 (e.g., using the tunable component 722) to operate the additional modal antenna 704 in the plurality of different modes of the additional modal antenna 704 based on the additional control signal.

Figure 8A:
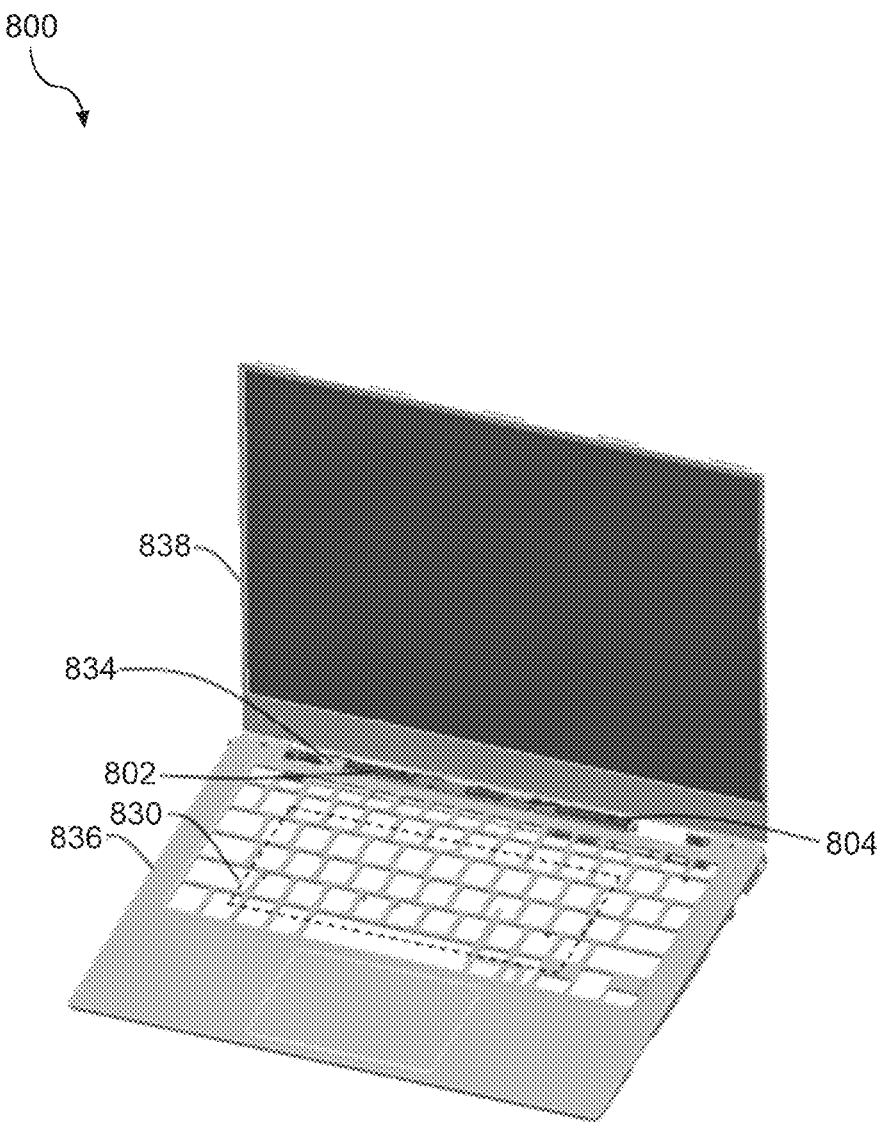
FIG. 8A depicts a perspective view of an embodiment of a mobile computing device according to aspects of the present disclosure.
Figure 8B:
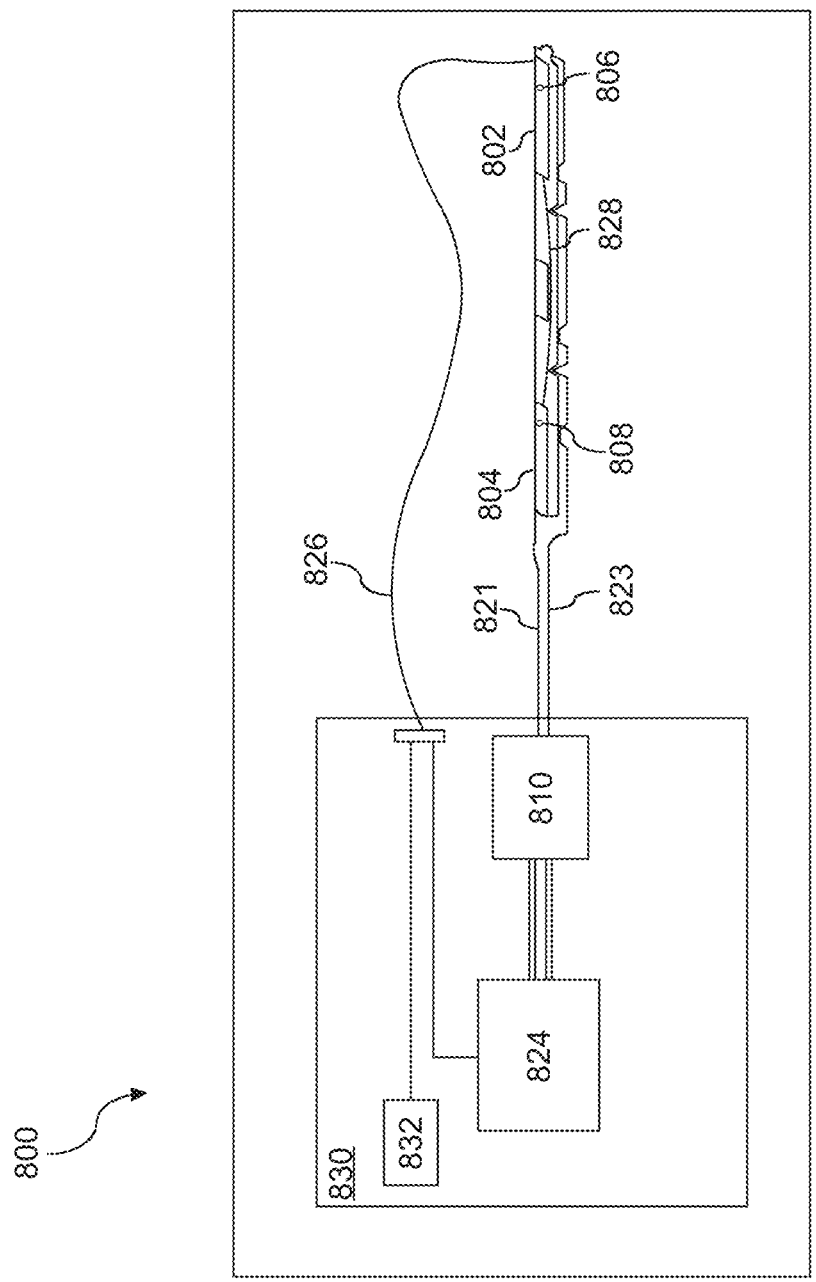
FIG. 8B depicts a schematic view of the mobile computing device of FIG. 8A.
Figure 8C:
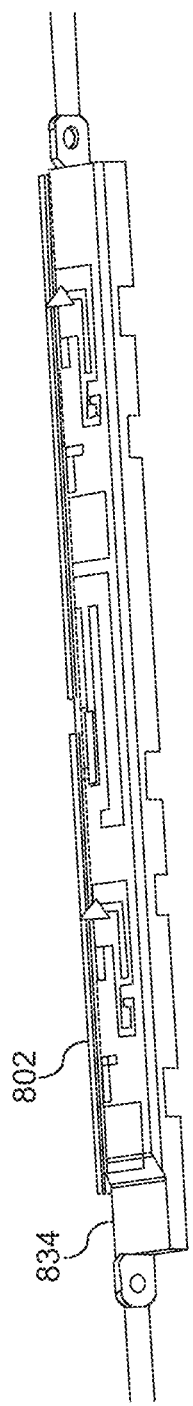
FIG. 8C depicts a perspective view of a hinge member of the mobile computing device of FIGS. 8A and 8B.

FIGS. 8A and 8B depict a perspective view and schematic view of an embodiment of a mobile computing device 800 according to aspects of the present disclosure. FIG. 8C is a perspective view of a hinge member 834 of FIGS. 8A and 8B. The mobile computing device 800 may be or include a laptop computer. However, in other embodiments, the mobile computing device 800 may be or include any suitable type of mobile computing device, such as a smartphone, tablet, or the like.

Referring to FIG. 8B, the mobile computing device 800 may include a printed circuit board 830 and a radio frequency circuit 810 coupled to the printed circuit board 830. The mobile computing device 800 may include a host processor 824 (e.g., a central processing unit) and a power supply unit 832.

Referring to FIG. 8A, the mobile computing device 800 may include an antenna system that is configured as described above with reference to the antenna system 700 of FIG. 7. may include a hinge member 834. A main body 836 may be pivotally coupled to the hinge member 834. A display screen support member 838 may be pivotally coupled to the hinge member 834. The printed circuit board 830 may be coupled to the main body 836. A modal antenna 802 may be coupled to the hinge member 834 and operatively connected with the radio frequency circuit 810 (FIG. B). The modal antenna 802 may include a driven element and a parasitic element positioned proximate to the driven element and be operable in a plurality of different modes for example as described above with reference to FIGS. 1A through 1C. An additional modal antenna 804 may similarly be coupled to the hinge member 834 and operatively connected with the radio frequency circuit 810 (FIG. B). The additional modal antenna 804 may include a driven element and a parasitic element positioned proximate to the driven element and be operable in a plurality of different modes for example as described above with reference to FIGS. 1A through 1C.

The radio frequency circuit 810, host processor 824, and modal antennas 802, 804 may generally be configured as described with reference to FIG. 7. The modal antennas 802, 804 may be remote from the radio frequency circuit 810. For example, the modal antennas 802, 804 may be coupled to a different component of the mobile computing device than the radiofrequency circuit 810. One or more transmission lines 821, 823 may couple the radio frequency circuit 810 with the modal antennas 802, 804. A first transmission line 821 may couple the radio frequency circuit 810 with the modal antenna 802; a second transmission line 823 may couple the radio frequency circuit 810 with the additional modal antenna 804. TA control line 826 may couple the host processor 824 to the first tuning circuit 806. An additional control line 828 may couple the first tuning circuit 806 to the second tuning circuit 808. The host processor 824 may be configured to transmit each of a control signal and an additional control signal over the control line 826 to the first tuning circuit 806. The first tuning circuit 806 may be configured to control an electrical characteristic associated with the parasitic element 814 of the modal antenna 802 (e.g., using the tunable component 816) to operate the modal antenna 802 in the plurality of different modes of the modal antenna 802 based on the control signal. The first tuning circuit 806 may be configured to transmit the additional control signal over the additional control line 828 to the second tuning circuit 808. The additional control circuit 808 may be configured to control an electrical characteristic associated with the parasitic element 820 of the additional modal antenna 804 (e.g., using the tunable component 822) to operate the additional modal antenna 804 in the plurality of different modes of the additional modal antenna 804 based on the additional control signal.

Figure 9:
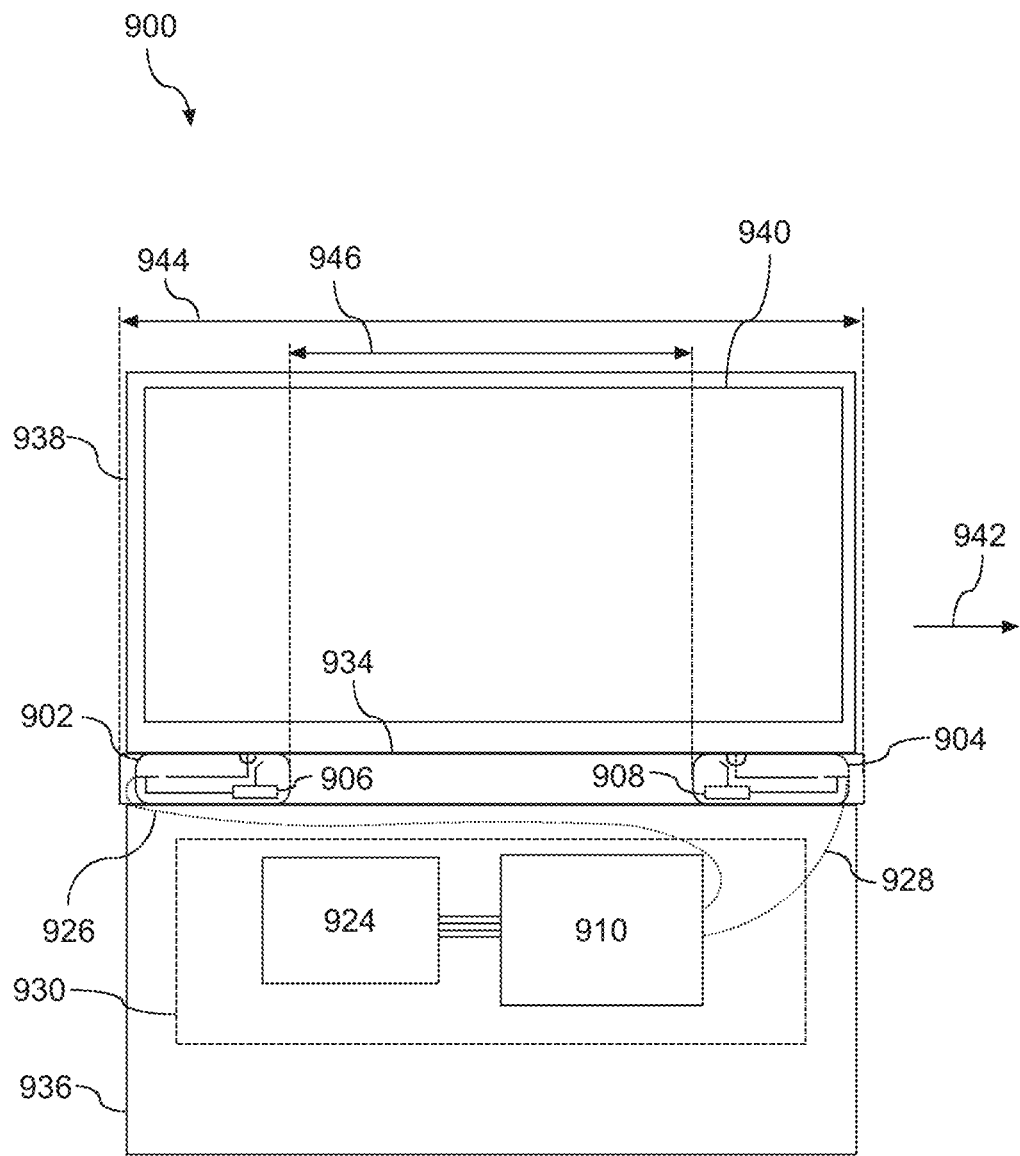
FIG. 9 illustrates an embodiment of a mobile computing device including modal antennas mechanically coupled to a hinge member of the mobile computing device.

FIG. 9 illustrates another embodiment of the mobile computing device 900 including an antenna system. The antenna system may be configured as described with respect to FIG. 6. A modal antenna 902 and/or an additional modal antenna 904 may be coupled to a hinge element 934. Each of a main body 936 and display screen support member 938 may be pivotally coupled to the hinge member 934. A display screen 940 may be coupled to the display screen support member 938. A tuning circuit 906 may be configured to control an electrical characteristic associated with the parasitic element of the modal antenna 902 to operate the modal antenna 902 in the plurality of different modes of the modal antenna 902 based on the control signal. A transmission line 926 may couple a radio frequency circuit 910 to the modal antenna 902. The radio frequency circuit 910 may be coupled to a printed circuit board 930 that is coupled to the main body 936.

The radio frequency circuit 910 may be configured to modulate a control signal onto the RF signal to generate a transmit signal for communication over the transmission line 926 to a tuning circuit 906. The tuning circuit 906 may be configured to demodulate the control signal such that the radio frequency circuit 910 can adjust the mode of the modal antenna 902 via the control signal.

In some embodiments, the mobile computing device 900 may include the additional modal antenna 904. An additional tuning circuit 908 may be configured to control an electrical characteristic associated with the parasitic element of the additional modal antenna 904 to operate the additional modal antenna 904 in the plurality of different modes. An additional transmission line 928 may couple the radio frequency circuit 910 to the additional modal antenna 904. The radio frequency circuit 910 may be configured to modulate an additional control signal onto an additional RF signal to generate an additional transmit signal for communication over the additional transmission line 928 to the additional tuning circuit 908. The additional tuning circuit 908 may be configured to demodulate the additional control signal such that the radio frequency circuit 910 can adjust a mode of the additional modal antenna 904 via the additional control signal.

The hinge member 934 may be elongated in a longitudinal direction 942. The hinge member 934 may have a length 944 in the longitudinal direction 942. The modal antenna 902 may be spaced apart from the additional modal antenna 904 in the longitudinal direction 942 by a spacing distance 946. A ratio of the length 944 of the hinge member 934 to the spacing distance 946 may be less than about 3.

Figure 10:
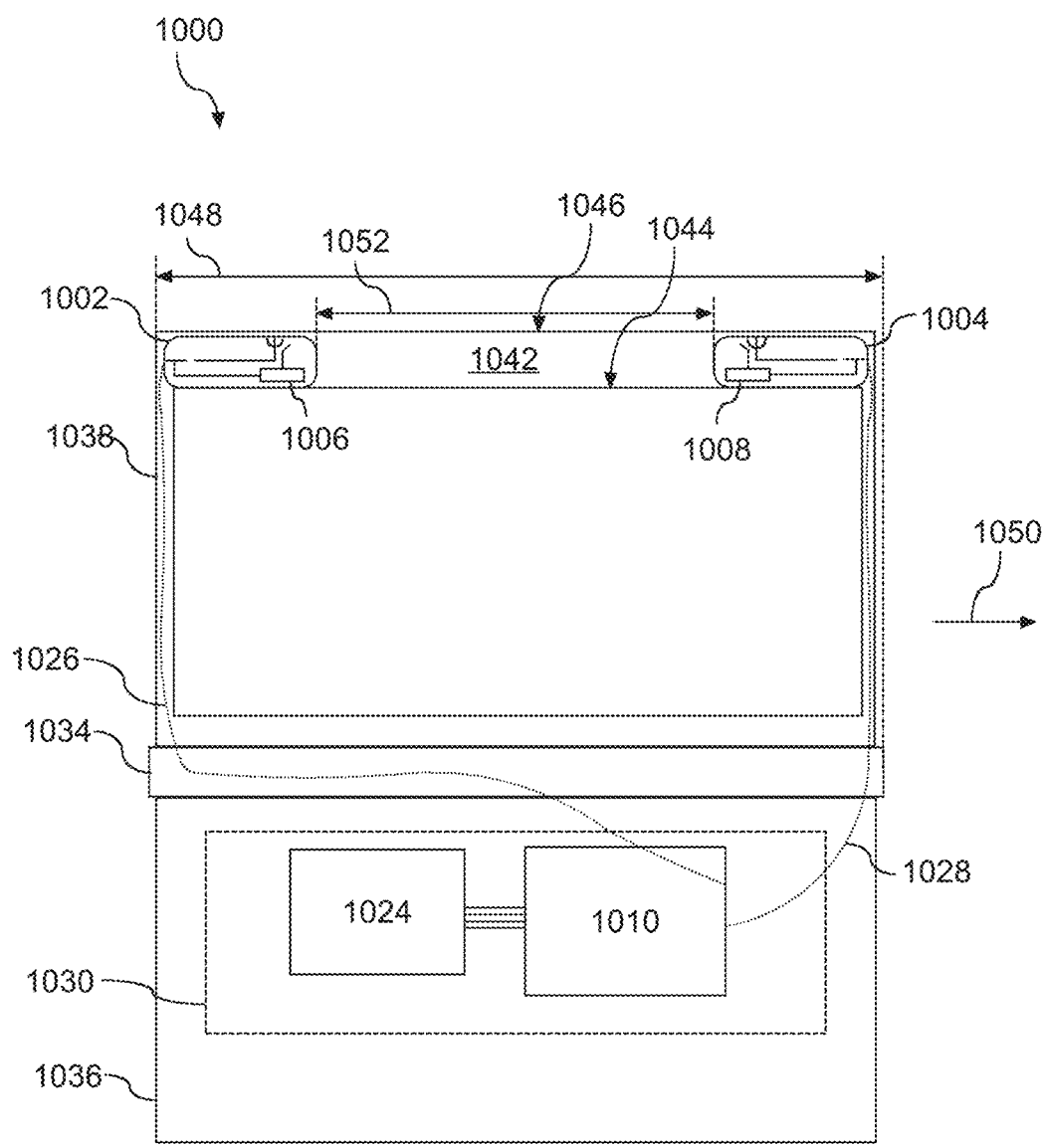
FIG. 10 illustrates another embodiment of the mobile computing device including modal antennas mechanically coupled to a display screen support member of the mobile computing device.

FIG. 10 illustrates another embodiment of the mobile computing device 1000, which may generally be configured as described above with respect to the mobile computing device 900 of FIG. 9. However, a modal antenna 1002 and an additional modal antenna 1004 of the mobile computing device 1000 may be coupled to a display screen support member 1038. The display screen support member 1038 may include a display screen 1040. The modal antenna 1002 may be coupled to the display screen support member 1038 in a bezel portion 1042 of the display screen support member 1038. The bezel portion 1042 may be located between a perimeter 1044 of the display screen 1040 and a perimeter 1046 of the display screen support member 1038.

The display screen support member 1038 may have a width 1048 in a longitudinal direction 1050. The modal antennas 1002, 1004 may be spaced apart in the longitudinal direction 1050 by a spacing distance 1052. A ratio of the width 1048 of the display support member 1038 to the spacing distance 1052 may be less than about 3.

Figure 11:
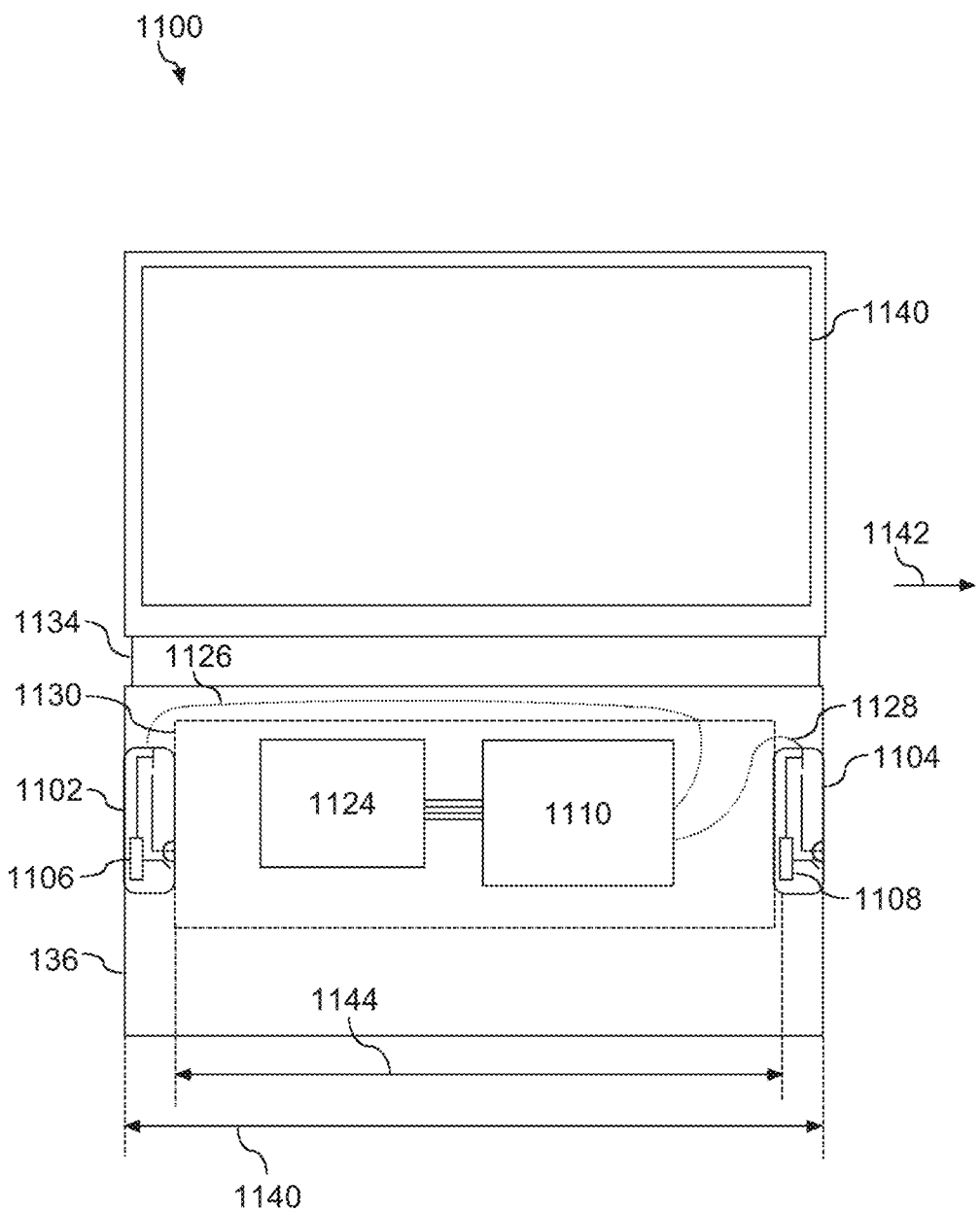
FIG. 11 illustrates another embodiment of the mobile computing device including modal antennas mechanically coupled to a display screen support member of the mobile computing device.

FIG. 11 illustrates another embodiment of the mobile computing device 1100, which may generally be configured as described above with respect to the mobile computing device 900 of FIG. 9. A modal antenna 1102 and an additional modal antenna 1104 may be coupled to the main body 1136. The main body 1136 may have a main body width 1140 in a longitudinal direction 1142. The modal antenna 1102 may be spaced apart from the additional modal antenna 1104 in the longitudinal direction 1142 by a spacing distance 1144. A ratio of the main body width 1140 to the spacing distance 1144 may be less than about 3.

It should be understood that in some embodiments, the antenna system 700 described above with reference to FIG. 7 may be employed with the modal antenna(s) located in a bezel portion of the display screen support member, for example as described above with reference to FIG. 10, or with the modal antenna(s) coupled to the main body, for example as described above with reference to FIG. 11.

Figure 12:
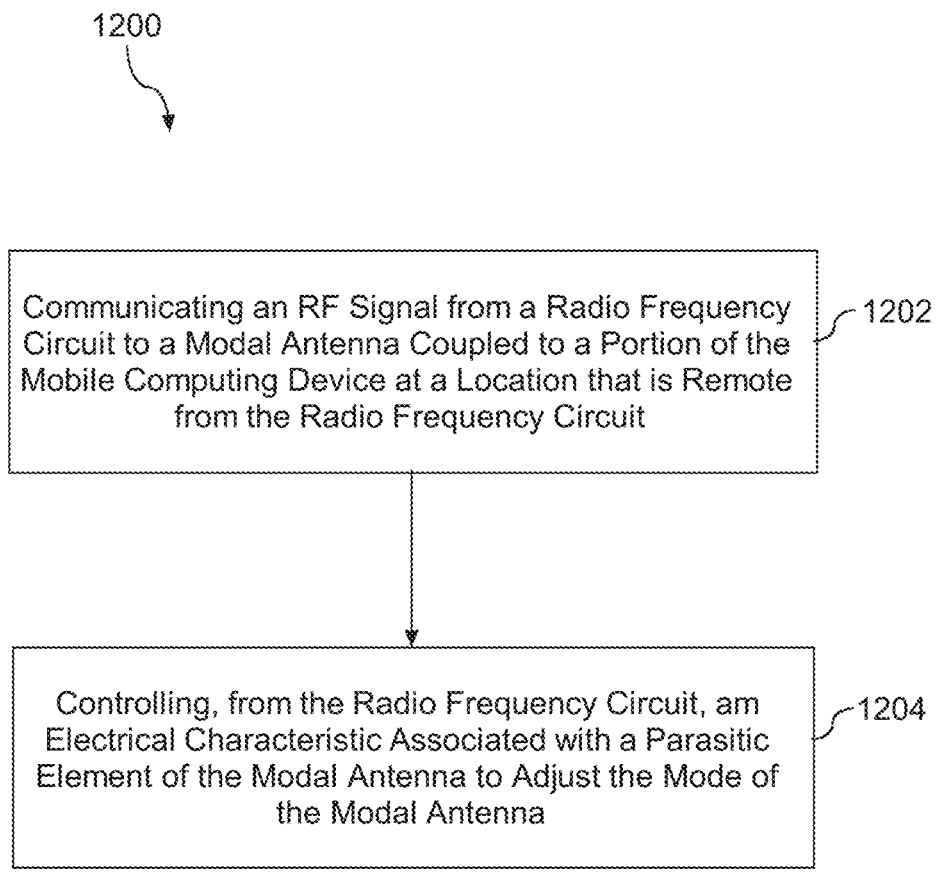
FIG. 12 is a flowchart of a method for controlling a modal antenna of a mobile computing device according to aspects of the present disclosure.

FIG. 12 depicts a flow diagram of an example method 1200 for controlling a modal antenna of a mobile computing device. Those of ordinary skill in the art, using the disclosures provided herein, will understand that various steps of any of the methods described herein can be omitted, expanded, performed simultaneously, rearranged, and/or modified in various ways without deviating from the scope of the present disclosure. In addition, various steps (not illustrated) can be performed without deviating from the scope of the present disclosure. Additionally, the method 1200 is generally discussed with reference to the antenna systems described above with reference to FIGS. 2 through 7 and/or the mobile computing devices described above with reference to FIGS. 8A through 11. However, it should be understood that aspects of the present method 1200 may find application with any suitable mobile computing device including a modal antenna.

The method 1200 may include, at (1202), communicating an RF signal from a radio frequency circuit to a modal antenna that is coupled to a portion of the mobile computing device at a location that is remote from the radio frequency circuit, for example as described above with reference to FIGS. 1A through 7. The modal antenna may be operable in a plurality of different modes, and each mode may be associated with a different radiation pattern.

The method 1200 may include, at (1204), controlling from the radio frequency circuit, an electrical characteristic associated with a parasitic element of the modal antenna to adjust the mode of the modal antenna. For example, a control signal may be transmitted from the radio frequency circuit to a tuning circuit. The control signal may be communicated to the tuning circuit over the transmission line(s) by modulating the control signal(s) onto the RF signal(s) to generate transmit signal(s) for transmission over the transmission lines, for example as described above with reference to FIGS. 2 through 6 and FIGS. 9 through 11. In other embodiments, however, the control signal may be transmitted over one or more control lines that are separate from the transmission line(s), for example as described with reference to FIGS. 7 through 8B.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A mobile computing device comprising:
   a main body;
   a display screen support member;
   a hinge member pivotally coupled to each of the display screen support member and the main body;
   a radio frequency circuit located on the main body;
   a modal antenna mechanically coupled to the hinge member at a location that is remote from the radio frequency circuit, the modal antenna comprising a driven element and a parasitic element positioned proximate to the driven element, the modal antenna operable in a plurality of different modes, each mode of the plurality of different modes is associated with a different radiation pattern;
   a tuning circuit located on the hinge member, the tuning circuit configured to control an electrical characteristic associated with the parasitic element of the modal antenna to operate the modal antenna in the plurality of different modes; and
   a transmission line coupling the radio frequency circuit to the modal antenna and the tuning circuit;
   wherein the radio frequency circuit is configured to transmit an RF signal over the transmission line to the modal antenna and configured to communicate a control signal to adjust a mode of the modal antenna over the transmission line;
   wherein the radio frequency circuit comprises a control circuit that is configured to modulate the control signal onto the RE signal to generate a transmit signal for communication over the transmission line to the tuning circuit; and
   wherein the tuning circuit is configured to demodulate the control signal such that the radio frequency circuit adjusts the mode of the modal antenna via the control signal.

2. The mobile computing device of claim 1, further comprising an additional modal antenna mechanically coupled to the hinge member, and wherein:
   the hinge member is elongated in a longitudinal direction and has a length in the longitudinal direction; the modal antenna is spaced apart from the additional modal antenna in the longitudinal direction by a spacing distance; and a ratio of the length of the hinge member to the spacing distance is less than about 3.

3. The mobile computing device of claim 2, wherein the radio frequency circuit is mechanically coupled to the main body.

4. The mobile computing device of claim 1, wherein the mobile computing device comprises a laptop computer.

5. The mobile computing device of claim 1, wherein the transmission line is a single coaxial cable.

6. The mobile computing device of claim 1, wherein the radio frequency circuit comprises a front end module that is configured to transmit the RF signal to the modal antenna.

7. The mobile computing device of claim 1, further comprising a host processor, and wherein the radio frequency circuit is configured to receive data from the host processor over a first connection for transmission via the RF signal and configured to receive control instructions over a second connection for adjusting the mode of the modal antenna, the second connection being distinct from the first connection.

8. The mobile computing device of claim 1, further comprising an additional transmission line and an additional modal antenna, the additional modal antenna comprising a driven element and a parasitic element positioned proximate to the driven element, the additional modal antenna operable in a plurality of different modes, each mode associated with a different radiation pattern, and wherein the radio frequency circuit is configured to transmit an additional RF signal over the additional transmission line to the additional modal antenna and adjust the mode of the additional modal antenna.

9. The mobile computing device of claim 1, further comprising:
   an additional modal antenna comprising a driven element and a parasitic element positioned proximate to the driven element, the additional modal antenna operable in a plurality of different modes, each mode associated with a different radiation pattern;
   an additional tuning circuit configured to control an electrical characteristic associated with the parasitic element of the additional modal antenna to operate the additional modal antenna in the plurality of different modes; and
   an additional transmission line coupling the radio frequency circuit to the additional modal antenna;
   wherein:
   the control circuit of the radio frequency circuit is configured to modulate an additional control signal onto an additional RF signal to generate an additional transmit signal for communication over the additional transmission line to the additional tuning circuit; and
   the additional tuning circuit is configured to demodulate the additional control signal such that the radio frequency circuit can adjust a mode of the additional modal antenna via the additional control signal.

10. The mobile computing device of claim 1, wherein the radio frequency circuit comprises a front end module that is configured to modulate the control signal onto the RF signal using amplitude-shift keying modulation.

* * * * *